United States Patent Office 3,585,244
Patented June 15, 1971

3,585,244
DIHALOMETHYLENE-BICYCLO[3.3.0]
OCTANES
Rostylow Dowbenko, Gibsonia, Pa., assignor to
PPG Industries, Inc., Pittsburgh, Pa.
No Drawing. Application Mar. 11, 1966, Ser. No.
554,231, now Patent No. 3,422,155, dated Jan. 14, 1969,
which is a continuation-in-part of application Ser. No.
254,575, Jan. 29, 1963. Divided and this application
May 23, 1968, Ser. No. 754,164
Int. Cl. C07c 23/32; C05g 3/08
U.S. Cl. 260—648         3 Claims

ABSTRACT OF THE DISCLOSURE

This invention relates to compounds of the formula:

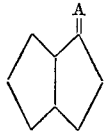

in which substituent A is —CX$_2$, wherein X is chlorine or bromine.

CROSS REFERENCES TO RELATED APPLICATIONS

This application is a division of application Ser. No. 554,231, filed Mar. 11, 1966, now U.S. Pat. No. 3,422,-155, which is in turn a continuation-in-part of application Ser. No. 254,575, filed Jan. 29, 1963, now abandoned.

It is known that cyclic alkenes, such as cyclohexane, form 1:1 addition products with various reactive compounds. For example, the reaction of cyclohexane with carbon tetrachloride produces 1-trichloromethyl-2-chlorocyclohexane. It would be expected, therefore, that compounds such as 1,5 - cyclooctadiene would produce a mixture of 1:1 and 1:2 adducts having similar structures.

It has been found, however, that the 1,5-cyclooctadiene does not undergo simple addition reactions in many instances, and that the reaction of 1,5-cyclooctadiene with polyhaloalkanes results in a transannular rearrangement to produce bicyclo[3.3.0]octane derivatives.

The bicyclo[3.3.0]octane derivatives to which this invention relates and which are produced as a result of the reaction of 1,5-cyclooctadiene with polyhaloalkanes can be represented by the formula:

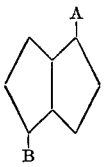

where A is —CX$_3$ or —CX$_2$R, X being halogen and R being an alkyl radical. The substituent B in the foregoing formula is either halogen or hydrogen.

Among the polyhaloalkanes which react with 1,5-cyclooctadiene to produce the aforesaid compounds are tetrahalomethanes, for example, carbon tetrahalides such as carbon tetrachloride and carbon tetrabromide; trihalomethanes, including haloforms such as chloroform and bromoform; and alkyl haloforms such as alkyl chloroforms and alkyl bromoforms, the alkyl groups being typically methyl, ethyl, and propyl, although other alkyl haloforms, for example, those having alkyl groups of up to about 12 carbon atoms or more, may also be employed. Also included within the scope of the invention are mixed polyhaloalkanes in which the halogens are different, for example, such compounds as chlorotrifluoromethane, dichlorodifluoromethane and trichlorobromomethane.

The reaction of tetrahalomethanes with 1,5 - cyclooctadiene produces compounds having the formula:

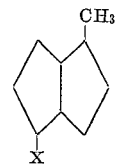

where X is halogen. As can be seen, one of the halogens from the tetrahalomethane is attached to the bicyclo-[3.3.0]octane nucleus in the 6-position and a trihalomethyl radical is attached in the 2-position.

The product of the reaction utilizing a trihalomethane has the following formula:

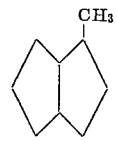

where X is halogen. In this instance, the hydrogen is attached to the 6-position of the bicyclo[3.3.0]octane nucleus, and again a trihalomethyl group is attached at the 2-position.

When an alkyl trihalomethane, i.e., an alkyl haloform, is employed, however, the reaction results in products of the following formula:

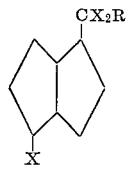

where X is halogen and R is the alkyl radical. In this instance again a halogen is attached to the 2-position and on alkyl dihalomethyl radical is attached to the 6-position.

In each of the above instances, products of similar structure are obtained when mixed polyhalomathanes are employed, i.e., polyhalomethanes in which different halogens are attached to the same carbon. Thus, in the formulas set forth each X ray represent a different halogen.

The reaction conditions used to produce the bicyclo[3.3.0]octane derivative from the polyhalomethane and 1,5-cyclooctadiene are not critical. For instance, no solvent is necessary, although one can be employed if desired. Similarly, the ratio of reactants does not affect operability of the reaction, although better yields are obtained if an excess of the polyhalomethane is present. It is for this reason that a substantial stoichiometric excess of the polyhalomethane is ordinarily utilized; usually at least about 5 moles of polyhalomethane per mole of 1,5-cyclooctadiene is employed.

In general, the reaction should be carried out utilizing conditions at which free radical-catalyzed additions take place. A catalyst as such is not always necessary, but when a catalyet is not employed, elevated temperatures, 100° C. or higher, and preferably 150 to 250° C., should be employed. Alternatively, a free radical-producing catalyst may be utilized. Among the catalysts which are often used are peroxides such as benzoyl peroxide and di(tertiary butyl)peroxide, are compounds such as azobis-(isobutyronitrile), ultraviolet light, ferric chloride, and similar known free radical-producing catalysts. The amount of catalyst is not critical, but the reaction is usually carried out using at least about 0.02 mole percent catalyst, based on 1,5-cyclopentediene, although higher or lower amounts can be employed if desired.

When a catalyst is present, the preferred temperature is that at which the catalyst yields free radicals at an appreciable rate. This temperature varies with the particular catalyst, for example, using benzoyl peroxide the temperature should be 70° C. or higher with azobis(isobutyronitrile) 50° C. or higher; with di(tertiary butyl) peroxide, 120° C. or higher; while with ultraviolet light room temperature is often satisfactory.

In crop culture, the condition and quality of soil is of utmost importance. Since nitrogen is necessary for plant growth, and since a common pathway of nitrogen assimilation of plants is through roots in the soil, adequate provision of nutrient nitrogen for plant growth must be made in the soil. Furthermore, it is necessary to provide favorable soil environment around plant roots, such as freeing the soil from soil-dwelling nematodes, fungi and bacteria.

The provision of supplying nutrient nitrogen is one of the foremost agronomic problems. The nitrogen in the soil is found to occur primarily in three forms: organic nitrogen, ammonium nitrogen, and nitrate nitrogen, of which ammonium nitrogen and nitrate nitrogen are the primary forms utilized by plants. This nitrogen is absorbed by plants in solution from the soil in the form of ammonium ions and nitrate ions.

The ammonium nitrogen in the soil is derived from bacterial conversion of organic nitrogen or from the added reduced nitrogen fertilizers, such as anhydrous ammonia, aqueous ammonia, ammonium phosphate, ammonium nitrate and ammonium sulfate. These ammonium compounds or inorganic reduced nitrogen compounds are readily soluble in water or aqueous soil medium.

The nitrite and nitrate nitrogen in the soil are derived from the oxidation of ammonium nitrogen by soil bacteria, or by the addition of inorganic nitrate fertilizers, such as ammonium nitrate, sodium nitrate, potassium nitrate and calcium nitrate. The process of oxidizing ammonium nitrogen to nitrite ion is carried out by certain soil bacteria and is known as nitrification. Nitrobacter organisms take over and convert nitrite to nitrate. The ionorganic nitrate compounds are also readily soluble in water and other aqueous soil mediums. When so dissolved, the nitrate nitrogen largely exists as the nitrate ion.

Because of the anionic nature of this ion, nitrate nitrogen is not adsorbed by soil colloids. Accordingly, the nitrate nitrogen is rapidly leached by rainfall and irrigation, and readily lost from feeding some of the plants. Further, the nitrate nitrogen is reduced by many soil bacteria, to gaseous volatile nitrogen oxides and to nitrogen gas. The latter process is known as denitrification and accounts for an additional loss of large quantities of nitrate nitrogen from the soil. The yearly loss from leaching and denitrification amounts to from 20 to 80 percent of the nitrate nitrogen found in the soil, whatever the anion's source.

The tremendous losses of soil nitrogen initiated by the rapid nitrification of ammonium nitrogen, and the leaching and bacterial denitrification of nitrate nitrogen, have depleted many agricultural oils of the nitrogen reserve and nitrogen requirements for plant nutrition. In order to replenish the soil nitrogen, the agriculturalist has resorted to the use of large amounts of synthetic nitrate fertilizers and reduced nitrogen fertilizers. In many instances, multiple fertilizer treatments during the growing season have been required to maintain the nitrogen requirements for plant growth. In this practice, the greater proportion of the employed fertilizers is in the form of reduced nitrogen fertilizers. By the expression "reduced nitrogen fertilizers" is meant fertilizers containing nitrogen in the reduced state, and is inclusive of ammonium salts, ammonia; and also water-soluble organic compounds readily convertible in soil to ammonia or ammonium ions, such as urea and cyanamide.

An object of this invention is the provision of a new and improved method of suppressing the loss of ammonium nitrogen from soil. An additional object is the provision of a new and improved method for suppressing the rapid nitrification of ammonium nitrogen in soil such that the product is not lost to the plant either through denitrification or leaching. A further object is the provision of a method of improving soil environment of plant roots by the fumigation and disinfection of soil, infected with bacteria and fungi (microorganisms that do not enhance or promote plant growth) which attack plant roots.

By the practice of this invention, the nitrification of reduced or ammonium nitrogen in the soil to nitrate nitrogen is suppressed, thereby preventing the rapid loss of ammonium nitrogen from the soil. In addition, by the practice of this invention, the control of soil inhabiting organisms such as bacteria and fungi may be achieved.

The provision of an effective amount of a novel dihalomethylene bicyclo[3.3.0]octane in the soil or growth medium, or amount sufficient to suppress nitrification or control soil dwelling organisms (parasiticidal dosage) is essential for the practice of the present invention. In general, good results are obtained when the growth medium is supplied with the bicyclooctanes in the amount of from 2 to 250 parts by volume per million parts by volume of medium. The preferred amount is consider to be from 5 to 50 parts by volume per million parts by volume of soil. In field applications, the compounds may be distributed in the soil in the amount of at least 0.25 pound per acre, and through such cross-section of the soil as to provide for the presence therein of an effective concentration of the agent. It is usually preferred that the compounds be distributed to a depth of at least 2 inches below the soil surface, and at a dosage of at least 0.5 pound per acre inch of soil. By dispersing very large dosages in growth media, a prolonged inhibition of nitrification may be obtained over a period of many months. Such application also provides more favorable growth media by freeing the soil from the organisms attaching plants and plant roots and contributing to adverse effects on plant growth. The concentration of the active compounds is eventually reduced to a minimum by decomposition in the soil.

In one embodiment of the present invention, the novel octanes are distributed throughout the growth media prior to seeding or transplanting the desired crop plant.

In another embodiment, the soil in the root zone of growing plants is treated with the novel octanes in an amount sufficient to inhibit nitrification and free the soil of bacteria and fungi but sublethal to plant growth. In such operations, the compounds should be supplied in the soil in an amount no greater than about 250 parts by volume per million parts by volume of the soil. By following such practice, no adverse effect is exerted by the compounds upon growth of seeds or plants. Oftentimes it is desirable to treat the soil adjacent to plants, and this procedure may be carried out conveniently in side-dressing operations.

In a further embodiment, soil may be treated with the novel octanes following harvest, or after following to free soil of plant attacking organisms, to prevent rapid loss of ammonium nitrogen and to build up the ammonium nitrogen formed by conversion of organic nitrogen compounds. Such practice provides favorable growth media and conserves the soil nitrogen for the following growing season.

In an additional embodiment, the soil is treated with the novel octanes in conjunction with the application of reduced nitrogen fertilizers. The treatment with the octanes may be carried out prior to, subsequent to, or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of the octane compounds in an ammonium nitrogen fertilizer composition constitutes a preferred embodiment of the present invention.

The required amount of the compounds may be supplied to growth media in from 1 to 50 gallons of organic solvent carrier, in from 1 to 27,000 or more gallons of aqueous carrier or in from about 10 to 2,000 pounds of solid carrier per acre treated.

The concentration of the compounds in compositions to be employed for the treatment of growth media is not critical and may vary considerably provided the required dosage of effective agent is supplied thereto. The concentration of the octanes may vary from 0.001 percent by volume to 95 percent by volume of the composition, depending on whether the composition is a soil treating composition or a concentrate composition and whether it is in the form of a solid or a liquid. In aqueous liquid treating compositions, concentrations of from 0.001 percent to 10 percent by volume of the octanes is considered the preferred composition. The concentration of the octanes in organic solvents may be from 2 to 90 percent by volume. Solid compositions generally contain from 5 to 50 percent by volume of the octane. Soil treating compositions usually contain 0.004 percent to 10 percent by volume of the octanes. In compositions to be employed as concentrates, the octane is oftentimes present in a concentration of from 2.5 to 95 percent by volume.

Liquid compositions containing the desired amount of the compounds may be prepared by dispersing the agents in one or more liquid carriers such as water and organic solvents with or without the aid of a suitable surface-active dispersing agent or emulsifying agent. Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the soil. When the solutions of active compounds in organic solvents are to be further diluted to produce aqueous dispersions, the preferred solvents include acetone and the alcohols. When the liquid carrier is entirely organic in nature, particularly desirable carriers are the petroleum distillates boiling almost entirely under 400° F. at atmospheric pressure and having a flash point above about 80° F.

Dispersing and emulsifying agents which may be employed in liquid compositions include condensation products of alkylene oxides and phenols and organic acids, alkyl aryl sulfonates, polyoxyalkylene derivatives of sorbitan esters, complex other alcohols, mahogany soaps and the like. The surface-active agents are generally employed in the amount of from 1 to 20 percent by weight of the combined weight of octanes and surface-active agent.

Solid compositions containing the active octane may be prepared by dispersing the compounds in finely divided inert solid carriers such as talc, chalk, gypsum, vermiculite, bentonite and the like, fuller's earth, attapulgite and other clays, various solid detergent dispersing agents and solid fertilizer compositions. In preparing such compositions, the carrier is mechanically admixed with the octane liquid or wet with a solution thereof in a volatile organic solvent. Depending upon the proportions of ingredients, these compositions may be employed without further modification or be considered concentrates and subsequently further diluted with solid surface-active dispersing agent, talc, chalk, gypsum or the like to obtain the desired treating composition. Furthermore, such concentrate compositions may be dispersed in water with or without added dispersing agent or agents to prepared aqueous soil treating compositions.

Soil treating compositions may be prepared by dispersing the octane in fertilizers such as ammonium fertilizer or organic nitrogen fertilizer. The resulting fertilizer compositions may be employed as such or may be modified such as by dilution with additional nitrogen fertilizer or with inert solid carrier to obtain a composition containing the desired amount of active agent for treatment of soil. Further, an aqueous dispersion of the octane fertilizer composition may be prepared and administered to the growth medium. Fertilizer compositions comprising the octane in intimate admixture with ammonium fertilizers constitute preferred embodiments of the present invention. In fertilizer compositions comprising a reduced nitrogen fertilizer, it is desirable that the octanes be present in an amount of at least 0.3 percent by weight based on the weight of the nitrogen present in the fertilizer as reduced nitrogen. Thus, when a fertilizer composition contains both reduced nitrogen and other forms of nitrogen such as in the case of ammonium nitrate fertilizer compositions, the amount of the octane is based on the weight of the nitrogen present in the ammonia component.

In operations carried out in accordance with the present invention, the soil may be impregnated in any convenient fashion with the active compounds or a composition containing these agents. For example, these modified or unmodified compositions may be simply mechanically mixed with the soil, applied to the surface of soil and thereafter dragged or disced into the soil to a desired depth; transported into the soil with a liquid carrier such as by injection, spraying or irrigation. When the distribution is carried out by introducing the compounds in the water employed to irrigate the soil, the amount of water is varied in accordance with the moisture content of the soil in order to obtain a distribution of the compounds to the desired depth. The compounds may be readily and conveniently distributed to a depth of from two to four feet by irrigation methods. The preferred methods embrace procedures using any of these steps wherein the compounds are distributed in the soil substantially simultaneously with a reduced nitrogen fertilizer.

The following examples illustrate the invention but are not to be construed as limiting.

EXAMPLE 1

Reaction of 1,5-cyclooctadiene and carbon tetrachloride

A mixture of 325 grams of 1,5-cyclooctadiene, 21.8 grams of benzoyl peroxide and 3 liters of carbon tetrachloride was refluxed for two days, an additional 14.5 grams of benzoyl peroxide was added and the mixture was refluxed for an additional 1.5 days. Most of the excess carbon tetrachloride was then removed by distillation, the residue was dissolved in ethyl ether and washed with aqueous sodium bicarbonate. After the ether was evaporated off, the remaining mixture was distilled and the main fraction obtained was redistilled, whereby there were obtained 283 grams of a fraction boiling at 87° C. at 0.10 millimeter pressure to 90° C. at 0.13 millimeter pressure. This product was identified as pure 2-trichloromethyl-6-chlorobicyclo[3.3.0]octane, having the structure:

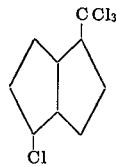

*Analysis.*—Calculated for $C_9H_{12}Cl_4$ (percent): C, 41.23; H, 4.62; Cl, 54.13. Found (percent): C, 41.27; H, 4.89; Cl, 53.84.

In addition to chemical analysis, the product was identified by gas chromatographic analysis, which showed essentially one compound; by infrared analysis which showed only two bands in the 3.4 micron region and no bands at wavelengths lower than 5.40 microns; by proton magnetic resonance analysis; and by its chemical behavior in characterizing reactions.

EXAMPLE 2

The same product as in Example 1 was produced by refluxing a mixture of 27 grams of 1,5-cyclooctadiene, 125 milliliters of carbon tetrachloride, 73 milliliters of isopropyl alcohol and 1 gram of ferric chloride hexahydrate for 36 hours. After washing the mixture with water and evaporating the organic layer, 54 grams of a liquid were obtained which was distilled, whereby there was obtained 45.4 grams of 2-trichloromethyl-6-chlorobicyclo[3.3.0]octane.

EXAMPLE 3

Reaction of 1,5-cyclooctadiene with chloroform

A mixture of 108 grams of 1,5-cyclooctadiene, 4.9 grams of benzoyl peroxide and 1 liter of chloroform was refluxed for 5 days with additions on consecutive days of four 2.4 gram portions of benzoyl peroxide, thus making the total amount of peroxide used 14.5 grams. Distillation of the reaction mixture yielded 74 grams of a liquid which was redistilled several times. There was obtained 30.0 grams of a fraction boiling at 110° C. to 111° C. at 9 millimeters pressure, identified as pure 2-trichloromethylbicyclo[3.3.0]octane having the structure:

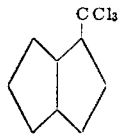

It was identified by its infrared spectrum, its nuclear magnetic resonance spectrum and its gas chromatogram, as well as by chemical analysis.

*Analysis.*—Calculated for $C_9H_{13}Cl_1$ (percent): C, 47.49; H, 5.75; Cl, 46.74. Found (percent): C, 47.19; H, 5.42; Cl. 46.45.

EXAMPLE 4

Reaction of 1,5-cyclooctadiene with bromotrichloromethane

A mixture of 27 grams of 1,5-cyclooctadiene, 3 grams of benzoyl peroxide and 148.5 grams of bromotrichloromethane was heated slowly to 75° C. whereupon an exothermic reaction occurred and the temperature rose to 114° C. The mixture was maintained at 80 to 90° C. for 24 hours, after which the excess bromotrichloromethane was distilled off and the residue distilled. There was obtained 54 grams of crude product comprising a mixture of 2-trichloromethyl-6-bromobicyclo(3.3.0)octane and 2-bromodichloromethyl-6-chlorobicyclo(3.3.0)octane, having the following structures:

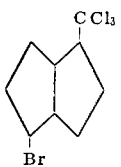

and

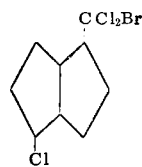

EXAMPLE 5

Reaction of 1,5-cyclooctadiene with carbon tetrabromide

A mixture of 22.4 grams of 1,3-cyclooctadiene and 275.4 grams of carbon tetrabromide was heated to 75° C. and stirred and irradiated at this temperature for 2 days under ultraviolet light from a sunlamp. After the excess carbon tetrabromide had been removed, there remained a residue comprising crude 2-tribromomethyl-6-bromobicyclo(3.3.0)octane, which tended to decompose upon further distillation.

EXAMPLE 6

Reaction of 1,5-cyclooctadiene with methyl chloroform

A mixture of 106 grams of 1,5-cyclooctadiene, 4.9 grams of benzoyl peroxide and 700 milliliters of methyl chloroform was refluxed at 71° C. for 5 days, with additions of four 2.4 gram portions of benzoyl peroxide on successive days starting with the second day. The removal of unreacted methyl chloroform and cyclooctadiene and distillation of the residue yielded a liquid which, after washing with aqueous sodium bicarbonate solution, was redistilled. There was obtained 24.4 grams of crude product comprising 2-(1,1-dichloroethyl)-6-chlorobicyclo(3.3.0)octane of the structure:

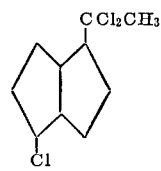

It has been further found that the foregoing products can be hydrolyzed to produce compounds in which the trihalomethyl group is converted to a dihalomethylene group. Such dihalomethylenebicyclo(3.3.0)octanes have the formula:

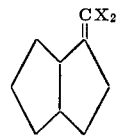

where X is halogen. In addition, the hydrolysis produces the corresponding acid in which the trihalomethyl substituent is replaced by a carboxyl radical. The hydrolysis is particularly easily accomplished in the case of the products obtained from trihalomethane. The hydrolysis reaction requires the presence of a strong acid, and is usually carried out by reacting the bicyclo(3.3.0)octane derivative with an aqueous solution of the acid. Among the acids which are thus employed are phosphoric acid and sulfuric acid, which are preferred, and nitric acid, which due to its oxidizing properties is less desirable since it may tend to engage in side reactions, thus reducing the yield of the desired product. The example below illustrates the ease and efficiency with which the dihalomethylene derivatives and acids are produced.

EXAMPLE 7

Hydrolysis of 2-trichloromethylbicyclo(3.3.0)octane

A mixture of 111 grams of 2-trichloromethylbicyclo (3.3.0)octane, produced as in Example 3 above, and 300 milliliters of 85 percent phosphoric acid was refluxed for 24 hours. The mixture was cooled, diluted with water, extracted with ether and the resulting extract separated into acidic and neutral fractions with aqueous sodium bicarbonate. The neutral fraction was distilled and gave 29.5 grams of a fraction boiling at 107° C. to 119° C. at 15 millimeters pressure. After redistillation this fraction was identified as 2-dichloromethylenebicyclo(3.3.0)octane of the structure:

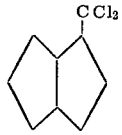

*Analysis.*—Calculated for $C_9H_{12}Cl_2$ (percent): C, 56.56; H, 6.33; Cl, 37.11. Found (percent): C, 36.76; H, 6.42; Cl, 35.26.

Distillation of the acid fraction gave 29.4 grams of exe, cis-bicyclo(3.3.0)octane-2-carboxylic acid of the structure:

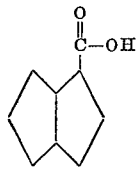

It had a boiling point of 89° C. at 0.1 millimeter pressure.

*Analysis.*—Calculated for $C_9H_{14}O_2$ (percent): C, 70.10; N, 9.13. Found (percent): C, 70.61; H, 9.00.

In these and other tests, various products corresponding to the formulas disclosed above were produced using varying reaction conditions and catalysts, and with reactants of different types within the class described.

In addition to providing an advantageous route to the corresponding acids and the dihalomethylene derivatives, as illustrated above, the compounds of this invention can be used for other purposes. For example, they are useful as plasticizers for resinous compositions, being high-boiling liquids of high halogen content. When used in this manner, they aid in imparting fire retardancy in addition to their plasticizing properties. They are also valuable chemical intermediates and can be used to produce insecticidal and biologically active materials, for example, through reduction or dehydrohalogenation reactions. The dihalomethylene compounds themselves are excellent pesticides. For instance, 2-dichloromethylenebicyclo[3.3.0]octane is an effective fungicide and miticida. In one test illustrating its utility in this regard, concentrations of 2-dichloromethylenebicyclo[3.3.0]octane as low as .01 percent prevented germination of *Monilia fructicola*, the casual organism of brown rot of stone fruit. It has also been shown effective against other fungi such as *Alternaria solani* and against mites such as the spotted spider mite (*Tetranychus telaerius*).

EXAMPLE 8

One tenth milliliter of 2-trichloromethyl-6-chlorobicyclo[3.3.0]octane was employed as the candidate bactericide against a pure culture of *Nitrosomonse europaes*, a bacterium known to oxidise ammonium ion to the nitrite ion.

The culture medium was prepared as follows:

$Na_2HPO_4$—13.5 g.
$KH_2PO_4$—0.7 g.
$MgSO_4 \cdot 7H_2O$—0.1 g.
$NaHCO_3$—0.5 g.
$(NH_4)_2SO_4$—2.5 g.
$FeCl_3 \cdot 6H_2O$—14.4 mg.
$CaCl_2 \cdot 2H_2O$—18.4 mg.
Distilled water—1000.0 ml.
Final pH, 8.0

Aliquots of 100 ml. of the foregoing prepared medium were placed in flasks, sealed, inoculated equally with the *M. europaes* bacterium, and a minimum time of about 6 days permitted to elapse to permit relatively profuse development of the bacterium. The candidate bactericides of 0.1 ml. volume was then added to the flasks. The inoculated flasks were incubated at 28° C. on a rotary shaker for six days, and then were analysed quantitatively for nitrite content.

In a check operation, other flasks were prepared in the identical manner, omitting inoculation with a bactericide.

Nitrite ion is the particular product of the oxidation of ammonium nitrogen by *N. europaes*. Nitrite ion was determined using the Grises-Ilsevay reagent, and a Klett Summerson colorimeter.

Percent inhibition of nitrite production was calculated as follows:

Percent Inhibition $$= \frac{\text{Nitrite produced in presence of candidate bactericide}}{\text{Nitrite produced in absence of candidate bactericide}} \times 100$$

The results obtained in testing 2-trichloromethyl-6-chlorobicyclo[3.3.0]octane indicated 94% inhibition of ammonium nitrogen oxidation to nitrite. With the check flasks, there was no inhibition of ammonium ion oxidation.

Workers in the microbiological art have long experienced difficulty in isolation of nitrifying bacteria, particularly in the isolation of the genus Nitrosomonas in pure culture. The availability of the bacterium in pure form greatly aids in conducting the measurements employed in the current determinations. The pure culture of *Nitrosomonas europaes* employed herein, were prepared according to the teaching of Lewis and Framer, reported at J. of Bacteriology, 76, pp. 324–328 (1958).

According to the provisions of the patent statutes, there are described above the invention and what are now considered to be its best embodiments, However, within the scope of the appended claims, it is to be understood that the invention may be practiced otherwise than as specifically described.

What is claimed is:

1. A compound of the formula:

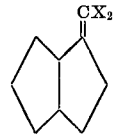

wherein X is chlorine or bromine.

2. A compound as in claim 1 wherein X is chlorine.

3. A method of producing a compound of the formula:

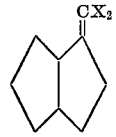

wherein X is chlorine or bromine, which comprises reacting a compound of the formula:

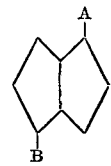

in which substituent A is a radical selected from the class consisting of —$CX_3$ and —$CX_2R$, wherein X is chlorine or bromine and R is alkyl and substituent B is selected from the class consisting of chlorine or bromine and hydrogen, with an aqueous solution of an acid selected from the group consisting of phosphoric acid, sulphuric acid and nitric acid.

References Cited

UNITED STATES PATENTS 3,422,155    1/1969    Dowbenko _____ 260—648C

DANIEL D. HORWITZ, Primary Examiner

U.S. Cl. X.R.

71—4; 252—8.1; 204—163; 260—45.7, 514; 424—352